E. BIANCHI.
APPARATUS FOR CONSTRUCTING HOLLOW CEMENT MONOLITHS OR BLOCKS.
APPLICATION FILED APR. 11, 1910.
1,040,856.
Patented Oct. 8, 1912.
2 SHEETS—SHEET 1.
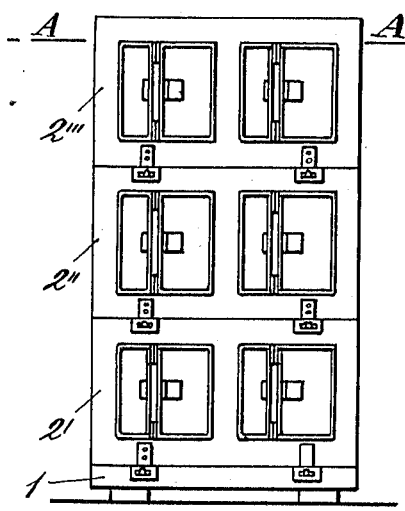
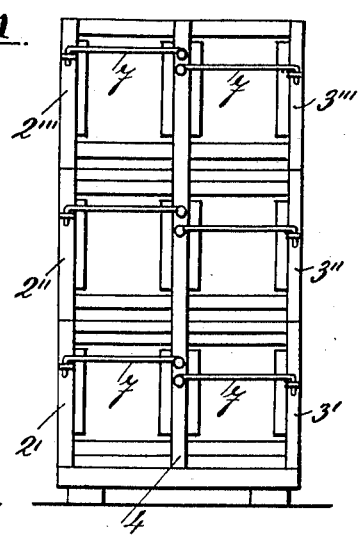
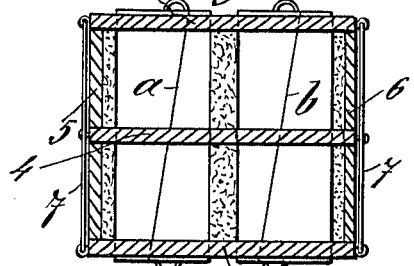
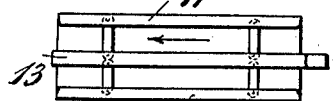
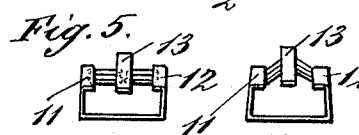
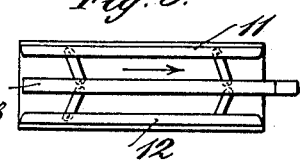
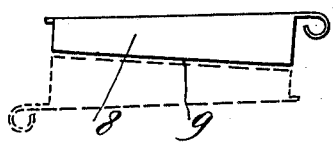
Inventor
Elia Bianchi E. BIANCHI.
APPARATUS FOR CONSTRUCTING HOLLOW CEMENT MONOLITHS OR BLOCKS.
APPLICATION FILED APR. 11, 1910.
1,040,856.
Patented Oct. 8, 1912.
2 SHEETS—SHEET 2.
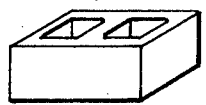
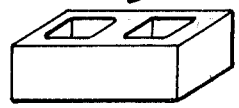
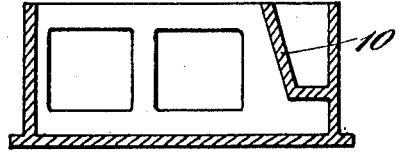
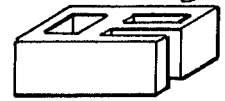
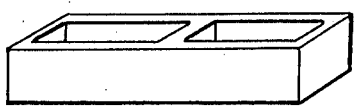
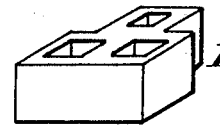
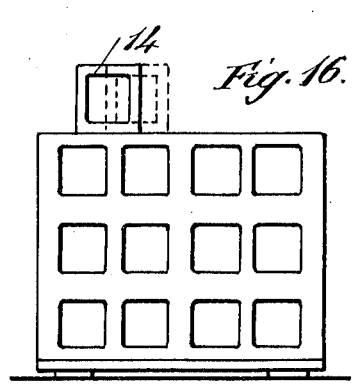
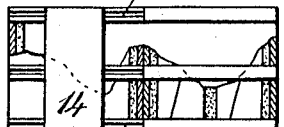
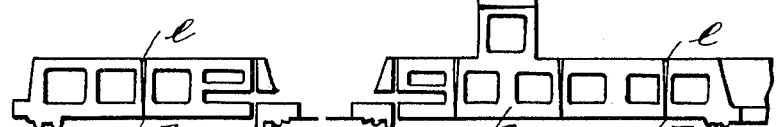
Witnesses
Inventor
Elia Bianchi
By
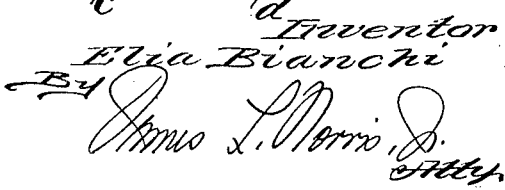
Atty.

UNITED STATES PATENT OFFICE.

ELIA BIANCHI, OF MILAN, ITALY.

APPARATUS FOR CONSTRUCTING HOLLOW CEMENT MONOLITHS OR BLOCKS.

1,040,856.   Specification of Letters Patent.   Patented Oct. 8, 1912.

Application filed April 11, 1910. Serial No. 554,788.

*To all whom it may concern:*

Be it known that I, ELIA BIANCHI, a subject of the King of Italy, residing at 16 Via Meravigli, Milan, in the Kingdom of Italy, have invented certain new and useful Improvements in Apparatus for Constructing Hollow Cement Monoliths or Blocks, of which the following is a specification.

In constructing cement buildings the various methods heretofore employed may be classified under the following heads:— (1.) Construction in reinforced or ferroconcrete. (2.) Construction by means of small hollow blocks of concrete formed by mechanical kneading which are produced by molding machines. In practice the first of these methods presents defects such for example as the irregularity of the surfaces when the application of the cement is finished and the cost of the scaffoldings for applying the concrete. In the second method of small hollow blocks used are obtained by compressing the mixed materials in an almost dry state. These materials present but little cohesion; they are porous and exceedingly hygrometric and consequently their life and strength is limited. Finally the cost price of these small blocks is considerable owing to the high price of the molding machine.

The employment of the special apparatus which forms the object of the present invention tends to obviate the above defects by rendering it possible to obtain constructional materials, perfect in structure and cohesion and economical to produce; scaffolding is not necessary for erecting the building, nor expensive machines for forming the blocks. This result is obtained: (*a*) By filling the molds with wet concrete of normal composition and allowing it to solidify for a considerable time (10 hours or more) before being removed and used. Formed in this way the resultant monoliths are very compact, strong and impermeable. (*b*) By utilizing an apparatus which accelerates the manufacture of the hollow monoliths and their removal from the molds and which renders it possible to obtain several monoliths (as many as 16 if desired) in a single operation, thereby producing an obvious and remarkable advantage in the output and reduction of the cost of manufacture.

In order to construct masonry buildings with blocks the following parts are required: angle parts, mortising parts, shoulder parts, channeled parts for shutters and parts for the architraves of doors and windows.

In accordance with the present invention the improved apparatus permits of obtaining the above named special parts without increased labor, thereby differentiating them from ordinary molds. The said apparatus likewise permits of producing by simple cold washing, which removes the incompletely hardened outer layer, the same result as hammering from the point of view of external appearance so that the effect obtained after washing is that of artificial stones. This constitutes another advantage of the present process.

A number of embodiments of the present apparatus and of the products that may be obtained by means of the same are illustrated by way of example in the accompanying drawing in which:—

Figure 1 represents a mold in external front elevation. Fig. 2 is an external side elevation of the same mold. Fig. 3 is a horizontal section on the line A—A of Fig. 1. Figs. 4 and 5 are respectively a side elevation and a section of a core for forming the holes. Figs. 6 and 7 are corresponding views during the withdrawal of the core. Fig. 8 is a top view of the core. Figs. 9, 10, 11, 12, 13 and 14 illustrate some typical monoliths. Fig. 15 illustrates a longitudinal section of a mold for casting the monolith serving for the embrasures of windows. Figs. 16 and 17 represent as an example of a multiple mold, a mold formed by coupling two normal molds which permits of obtaining a larger number of blocks in a single casting operation; one of these blocks is of the type represented in Fig. 13. Fig. 18 is a plan view of a part of a building composed of monoliths molded in accordance with the present invention.

The mold which is represented by way of example in the drawing (Fig. 1) is of parallelepiped structure and constituted by a bottom 1 to which two vertical outer walls 2, 3 are fixed; these walls 2 and 3 are composed of elements 2′ 2″ 2‴ and 3′ 3″ 3‴ hinged or otherwise connected one with the other in such a manner as to constitute as a whole a dismountable structure; the corresponding elements of these walls are provided square or other holes registering one with the other and through which the cores are passed; a third vertical wall 4 is also fixed to the bottom 1 and in it holes for the passage of the cores are likewise formed; the vertical walls 5 and 6 complete the envelop of the parallelepiped structure; when the mold is assembled the walls 2, 3 and 4 are connected one with another by hasps 7.

The cores are composed of two identical cuneiform parts 8 arranged in opposite directions as shown in Fig. 8 by causing the flat surfaces 9 to slide one upon the other; when these parts have been arranged in the mold they present the appearance indicated in Fig. 3 in which $a\ b$ are the lines of division along which the faces 9 of the parts arranged in juxtaposition bear. The cores thus arranged in place leave cavities in which the cement poured in from above becomes massed; in the very simple mold represented in Figs. 1, 2 and 3 the blocks represented in Figs. 9 and 10 are obtained. When it is desired to give these blocks a trapezoidal shape in order to form monoliths for use as window embrasures (Fig. 11) it is only necessary to partition off the interior of the mold into which the cement is poured by means of a partition 10 (Fig. 15).

In order to permit of readily withdrawing the cores they are rendered elastic by means of a device shown in Figs. 4, 5, 6 and 7; the upper and lower walls of each semi-core 8 are jointed to a central rod 13 in such a manner that in pressing the latter in the direction indicated by the arrow (Fig. 4) the walls 11, 12 are caused to set themselves in parallel relation to each other while by acting in the direction of the arrow (Fig. 6) upon the rod 13 as is the case when the cores are withdrawn, the walls 11, 12 come together and in becoming detached from the cement enable the cores to be very speedily withdrawn.

When it is desired to mold blocks for connecting transverse walls with longitudinal walls (Fig. 13 and Fig. 18, $c$) recourse is had to the type of mold shown in Fig. 16 and in Fig. 17; that is to say a mold of the normal type or a double mold such as represented is arranged in juxtaposition to a part 14 arranged jutting out from the general structure situated beneath. This mold 14 is displaceable on rails 15 in such a manner that monoliths differing one from the other as regards the point of junction of the piece that is to be interposed in the transverse wall can be cast. The monoliths are formed with a trapezoidal contour, that is to say with the ends slightly convergent; in laying them the vertical ridges $d$ (Fig. 18) are caused to coincide; they are directed toward the exterior and the cuneiform interstice $e$ formed by the divergence of the two contiguous faces is filled with cement or similar material which insures the rigidity of the entire system of masonry.

It will of course be understood that the molds and the form of the parts are described simply by way of example and any modifications not altering the principle of the invention are to be regarded as comprised within its ambit.

What I claim and desire to secure by Letters Patent of the United States is:—

1. A dismantable block mold consisting, in combination, of a base; pairs of opposed vertical side walls hinged at their lower edges to the marginal edges of the base, one pair of walls comprising a series of edgewise superposed sections having their mutually-adjacent horizontal edges hinged together; a vertical partition wall hinged at its lower edge to said base and arranged between and in spaced parallel relation to said pair of walls; and removable connections between said partition wall and the adjacent sections of said side walls.

2. A dismantable block mold consisting, in combination, of a base; pairs of opposed vertical side walls hinged at their lower edges to the marginal edges of the base, one pair of walls comprising a series of edgewise superposed sections having their mutually-adjacent horizontal edges hinged together; a vertical partition wall hinged at its lower edge to said base and arranged between and in spaced parallel relation to said pair of walls; and oppositely-extending pairs of connecting devices attached at their inner ends to the vertical edges of said partition wall and having their outer ends removably engaged with the vertical edges of the adjacent sections of said side walls.

3. A dismantable block mold consisting, in combination, of a base; pairs of opposed vertical side walls hinged at their lower edges to the marginal edges of the base, one pair of walls comprising a series of edgewise superposed sections having their mutually-adjacent horizontal edges hinged together, the corresponding sections of said pair of walls being formed with registering core openings; a vertical partition wall hinged at its lower edge to said base and arranged between and in spaced parallel relation to said pair of walls, said partition wall being formed with a vertical series of core openings which register with the core openings in the adjacent sections of said pair of walls;

cores removably arranged within said mold and extending through the registering openings in said partition and side walls; and removable connections between the vertical edges of said partition wall and the vertical edges of the adjacent sections of said side walls.

In testimony whereof I affix my signature in presence of two witnesses.

ELIA BIANCHI.

Witnesses:
CHAS. H. SLISCHER,
LYLE ROBB.

Copies of this patent may be obtained for five cents each, by addressing the "Commissioner of Patents, Washington, D. C."